United States Patent [19]

Patterson

[11] Patent Number: 4,657,050
[45] Date of Patent: Apr. 14, 1987

[54] PIPELINE INSULATION SYSTEM
[75] Inventor: Maurice M. Patterson, Houston, Tex.
[73] Assignee: Shell Oil Company, Houston, Tex.
[21] Appl. No.: 634,342
[22] Filed: Jul. 25, 1984
[51] Int. Cl.⁴ .............................................. F16L 9/14
[52] U.S. Cl. .................................. 138/149; 138/172; 138/DIG. 6
[58] Field of Search ............... 138/148, 149, 121, 122, 138/172, DIG. 6; 29/458

[56] References Cited
U.S. PATENT DOCUMENTS
4,590,971  5/1986  Webster et al. ..................... 138/149

Primary Examiner—James E. Bryant, III

[57] ABSTRACT

An insulation system is provided for subsea arctic pipelines which utilizes water blocks to prevent insulation failure. Water is blocked in both radial and longitudinal direction.

4 Claims, 3 Drawing Figures

PIPELINE INSULATION SYSTEM

BACKGROUND OF THE INVENTION

This invention relates to pipelines, and particularly to an oil transportation pipeline especially adapted for use transporting petroleum over long distances offshore in an arctic environment.

Because of the large petroleum resources available offshore Alaska, a great deal of research and study has been undertaken in recent years in order to determine whether it would be feasible to construct an oil pipeline extending offshore. A pipeline buried under the bottom of the ocean has its own inherent problems, perhaps the most significant of which is the effect of pipeline temperature on the permafrost under the ocean. Permafrost is frozen soil, much of which contains large quantities of frozen water. Its strength is dependent upon the frozen condition of its water content. Thus, if melting occurs, the permafrost may no longer provide support. Oil, on the other hand, only flows efficiently at relatively high temperatures, its viscosity varying adversely with the temperature. Furthermore, at high flow rates, oil temperature may actually increase in the pipeline. An ordinary pipeline buried in permafrost would transmit heat to the permafrost, Even if adequate support remained, the application of heat by the pipeline to the permafrost over a long period of time would cause a pool of water to collect which would continue to grow into a large pond or "thaw bulb", possibly causing a great deal of damage to the pipeline and to the environment.

Accordingly, it is desirable in the art to provide an arrangement of insulating, thermally absorbing and/or dissipating elements controlling heat flow between a pipeline and its environment. The insulating elements also should serve to maintain relatively stable temperature differentials between heated materials in the pipeline and adjacent ground support, so that there is a minimal effect of one on the other.

SUMMARY OF THE INVENTION

The primary purpose of the present invention is to provide a method for insulating a pipeline segment, which method and the product thereof are economical in use, and which produce a pipeline which does not subject arctic regions to the dangers of permafrost thaw caused by heat flowing from the pipeline. Preferably, the method includes the steps of covering the pipeline segment with a layer of high density plastic, forming circumferential ribs about the layer of high density plastic, covering the layer of high density plastic between the circumferential ribs with a layer of plastic foam, and covering the plastic foam and the high density plastic with a layer of rigid material. Preferably, the high density plastic is extruded by moving a pipeline through an extruder head and circumferential ribs in the high density plastic are formed by periodically slowing down the pipeline as it moves through the extruder head. Also preferably, the plastic foam and the circumferential ribs are shaved to the same outside diameter and adhesive is applied to the shaved part of the ribs and high density plastic is extruded about the plastic foam and the circumferential ribs.

Other purposes, distinctions over the art, advantages and features of the invention will be apparent to one skilled in the art upon review of the following.

DESCRIPTION OF PREFERRED EMBODIMENTS

This invention pertains to an insulation system for subsea arctic pipelines wherein water is blocked from the pipeline by the insulation in both radial and longitudinal directions. The water block material is preferably a high density plastic, such as high density polyethylene, which protects the main insulation which is preferably a plastic foam, such as polyurethane foam. Water blocks or ribs are necessary to prevent insulation failure that could result in formation of a large thaw bulb beneath the pipeline. The distance between longitudinal blocks or ribs is preferably on the order of 20 to 30 times the pipeline diameter. One block for every 3 to 4 inches of foam insulation generally gives the required radial protection.

In accordance with the present invention, the insulation system is placed on the pipeline in several steps:

(1) First, high density plastic, such as polyethylene, is extruded over the pipe. Every time a block or rib is needed, the pipe is temporarily slowed down and a rib is formed on the undercoat. Alternatively, the rate of extrusion could be temporarily increased to form the rib.

(2) After the ribs or blocks are in place, the pipe is then covered with plastic foam just short of the rib height.

(3) A shaving operation then turns or otherwise reduces pipe, insulation and rib to the same outside diameter. The thickness of the insulation is preferably about 1/12th to 1/10th the diameter of the pipe.

(4) A coat of low density plastic, such as polyethylene, or mastic is preferably applied to the exposed tip of each rib.

(5) Step 1 preferably is repeated wih a high density plastic rib section being formed over the existing plastic foam.

(6) Step 2 preferably is repeated and then step 3 is repeated with the objective of making the insulation thickness about 1/6th to 1/5th the diameter of the pipeline.

(7) More mastic or low density plastic is applied to the rib tips and a final smooth coating of high density plastic, preferably about 0.25 to 0.5 inches, is then applied over the entire length of the pipeline segment.

The above described insulation then covers all the pipeline segment except for a portion at each end, for example about one foot from each end, which is left exposed. These terminal portions can then be sealed or water blocked in at least two ways:

(1) A longer or higher rib can be formed at each end and a smooth overcoat of high density plastic bonded to it. Preferably, this rib would be twice as high as the other ribs. Mastic or low density plastic is deposited between the overcoat and the higher rib.

(2) The foamed plastic insulation can be machined so that the radial face is perpendicular to the pipe axis. The ring or donut of high density plastic can then be glued to the resulting flat surface. Mastic or low density plastic can be used as a secondary sealer.

Figure 3:
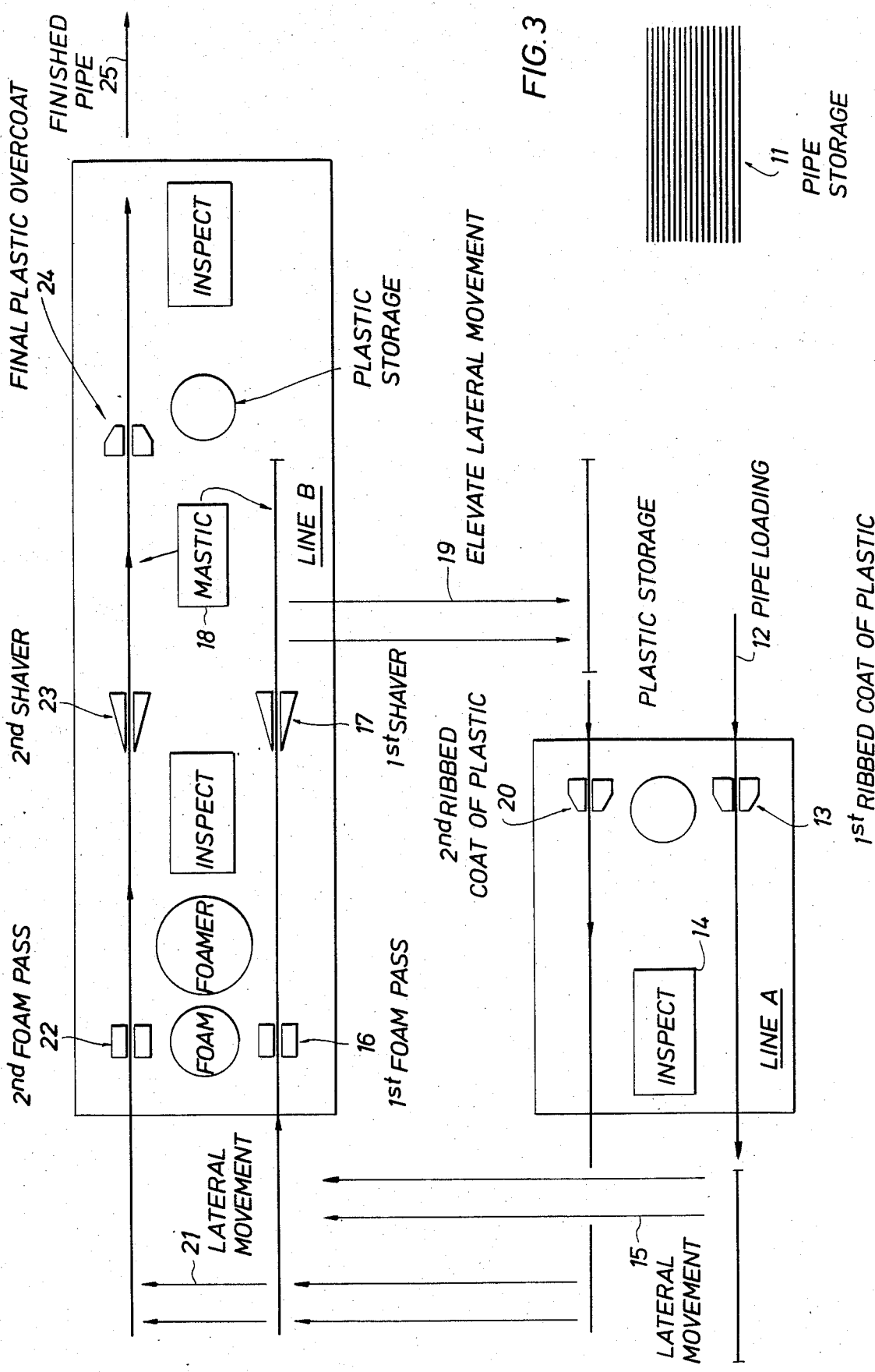
FIG. 3 depicts a pipe insulation system plant layout.

FIG. 3 discloses a plant layout scheme that can put the insulation system above described on almost any size pipe, The line is not continuous because of the stop-start action preferably employed to put the ribbed high density on the pipe. Generally, two construction/assembly lines, A and B, are employed, and the pipe starts through line A where the first rib is put on. It is then moved laterally at about a 2-foot elevation, more or less, to the beginning of line B. At this point foam plastic is applied. After the pipe has been moved preferably about 40 feet, at about 2 feet per minute for example, the insulation will be rigid enough to be shaved to the correct outside diameter. After mastic is applied to the exposed ribs, the pipe is then elevated to about 6 feet, more or less, and moved laterally back to the top of line A. There the second ribbed coat of high density plastic is placed over the foam. This pipe is now about 6 feet, more or less, above the ground so as not to interfere with the other pipe leaving line A for the first time. The pipe with the second ribbed cover on it is foamed on line B. This latter pipe is then shaved or otherwise reduced to the proper outside diameter, mastic is applied, the final coat of high density plastic is put on, and the ends of the pipe trimmed and sealed. The pipe in line B is a continuous string held together at the joints by special cradles which are removed as the pipe leaves line B.

Having thus generally described the apparatus and method of the invention, as well as its numerous advantages over the art, the following is a more detailed description thereof given in accordance with specific reference to the drawings.

Figure 1:
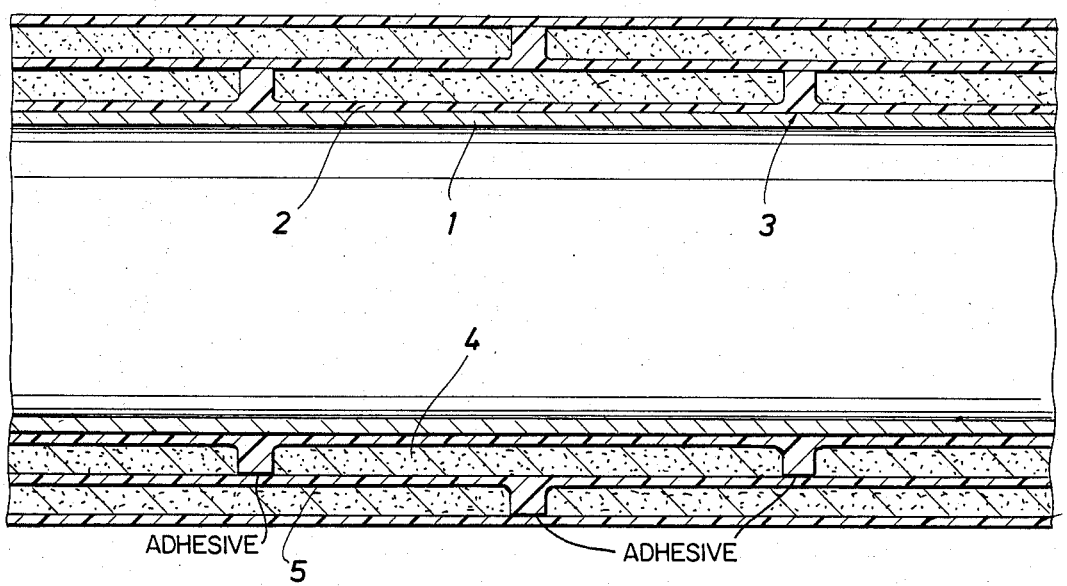
FIG. 1 shows a pipeline segment insulated in accordance with the invention.

FIG. 1 discloses a steel pipe, which is preferably joined by welding, having a high density plastic 2 as a first layer adjacent to the pipe and having longitudinal flow blocks 3 which are spaced apart along the first layer 2. Between the flow blocks 3 is placed a foam 4, and outside foam 4 and longitudinal flow block 3 is added a radial flow water block 5.

Figure 2:
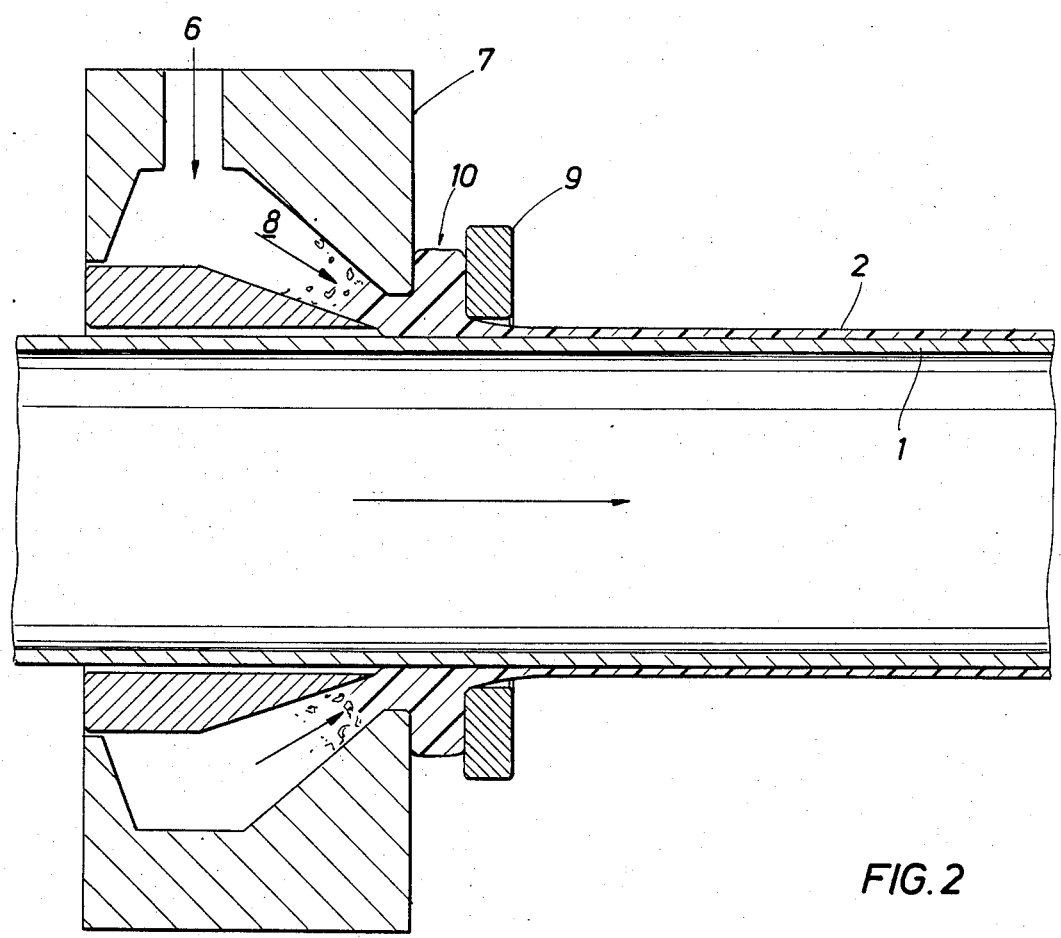
FIG. 2 shows the technique for forming ribs in the first layer of plastic extruded upon the pipeline.

FIG. 2 provides a cutaway view of the extruded rib forming device utilized in accordance with the present invention. The direction of the motion of pipe 1 is shown by the arrow. The high density plastic for the first layer 2 is introduced via inlet 6 as shown by the direction of the arrow, through the compression extruder head 7 and through the extruder nozzle 8 as shown by the direction of the second arrow. Periodically, the pipe preferably is slowed down as it travels through the compression extruder head so that a blob or mass 10 of high density plastic forms a rib. Then the pipe is speeded up and more of the layer 2 is then formed. This operation is subsequently repeated to form longitudinal flow blocks further down the layer 2.

In FIG. 3 is shown a pipe insulation system/plant layout. Pipe is taken from pipe storage 11 to a pipe loading zone 12 and then covered with a first ribbed coat of high density plastic 13. From there, the pipe is moved past inspection 14 and via a lateral movement 15 to line B, where the pipe is first passed through a station 16 to apply plastic foam, and then through a first shaver 17, where the foam and rib are shaved or otherwise reduced to the same outside diameter. Mastic 18 preferably is applied at this time. From there, the pipe is elevated, preferably to about 6 feet, and a lateral movement occurs via line 19, and the pipe then passes through a station 20 wherein a second ribbed coat of high density plastic is applied. Then the line makes a lateral movement where it is elevated about 6 feet via line 21 and then proceeds through a foam station 22 and a second shaver 23, wherein the latter insulation is reduced to a common diameter with the second ribs. Finally, the pipe is passed through station 18 wherein mastic is applied, and then to a final overcoating of high density plastic in station 24, resulting in the finished pipe 25.

The foregoing description of the invention is merely intended to be explanatory thereof, and various changes in the details of the described method and apparatus may be made within the scope of the appended claims without departing from the spirit of the invention.

What is claimed is:

1. A pipeline insulation system comprising:
   a pipeline segment;
   a layer of high density plastic encompassing the pipeline segment;
   circumferential ribs which encircle and are integral with the layer of high density plastic;
   a layer of plastic foam covering the layer of high density plastic between the circumferential ribs;
   a layer of rigid material covering the plastic foam and the layer of high density plastic;
   circumferential ribs which encircle and are integral with the layer of rigid material, the latter circumferential ribs being located laterally along the length of the pipeline segment between the former circumferential ribs; and
   a layer of plastic foam covering the layer of rigid material between the latter circumferential ribs and a layer of rigid material covering the latter layer of plastic foam.

2. The insulation of claim 1 wherein the layer of rigid material is high density plastic.

3. The insulation of claim 1 wherein the rigid materials are high density plastic.

4. The insulation of claim 3 wherein the circumferential ribs and the respective plastic foam therebetween have the same outside diameters and an adhesive is between the outside layers of high density plastic and the respective circumferential ribs.

* * * * *